US012277131B2

(12) United States Patent
Dasi et al.

(10) Patent No.: US 12,277,131 B2
(45) Date of Patent: Apr. 15, 2025

(54) METADATA DRIVEN AUTOMATIC DATA INTEGRATION

(71) Applicant: T-Mobile Innovations LLC, Overland Park, KS (US)

(72) Inventors: Ugandhar Dasi, Alpharetta, GA (US); Ramanjaneya Reddy Thirupathi, Atlanta, GA (US)

(73) Assignee: T-Mobile Innovations LLC, Overland Park, KS (US)

( * ) Notice: Subject to any disclaimer, the term of this patent is extended or adjusted under 35 U.S.C. 154(b) by 298 days.

(21) Appl. No.: 17/515,361

(22) Filed: Oct. 29, 2021

(65) Prior Publication Data

US 2023/0140109 A1     May 4, 2023

(51) Int. Cl.
*G06F 16/25*     (2019.01)

(52) U.S. Cl.
CPC .................................. *G06F 16/254* (2019.01)

(58) Field of Classification Search
CPC ..................................................... G06F 16/254
See application file for complete search history.

(56) References Cited

U.S. PATENT DOCUMENTS

| | | | | |
|---|---|---|---|---|
| 7,133,142 B2* | 11/2006 | Matsuura | ........... | H04N 1/00416 |
| | | | | 358/1.14 |
| 9,483,198 B1* | 11/2016 | Alva | ...................... | G06F 3/0683 |
| 2007/0136324 A1* | 6/2007 | Xu | ......................... | G06F 16/254 |
| 2015/0178358 A1* | 6/2015 | Baessler | .................. | G06F 16/93 |
| | | | | 707/602 |
| 2015/0310076 A1* | 10/2015 | Rambo | ............... | G06F 16/2379 |
| | | | | 707/602 |
| 2018/0150528 A1* | 5/2018 | Shah | ...................... | G06F 16/254 |
| 2018/0210935 A1* | 7/2018 | Yazicioglu | ............ | G06F 40/186 |
| 2022/0188324 A1* | 6/2022 | Ramesh | ................ | G06F 16/254 |

\* cited by examiner

*Primary Examiner* — Charles D Adams

(57) ABSTRACT

A method comprises receiving, from a user equipment via a server-to-user equipment application programming interface, a request to store a source file in a target database as a target file compatible with the target database, wherein the request comprises metadata describing the source file, a source database storing the source file, and the target database, determining by an integrator application of the data integration server, a source file format of the source file based on the metadata, determining, determine, by the integrator application, a target file format of the target file based on the metadata, wherein the target file format is compatible with the target database, and automatically generating, by the integrator application, an integrated script based on a plurality of pre-defined scripts, the metadata, the source file format, and the target file format.

15 Claims, 9 Drawing Sheets

METADATA DRIVEN AUTOMATIC DATA INTEGRATION

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Service providing companies are increasingly migrating data from localized data stores, owned and operated by the service provider itself, to a centralized data store, such as a cloud-based storage server owned and operated by a third-party cloud hosting company. Such a migration provides several benefits to the company, such as substantially decreasing storage overhead and maintenance costs, while providing the ability to access the data in a secure manner from any location. In the cloud-based data storage solutions, the cloud hosting company provides a fixed-size server space in the centralized data store to service providers, possibly for a fee. The service providers may store data as needed in the fixed-size server space. The service provider still owns the stored data, but the hosting company owns and maintains the required hardware. The data may be stored across one or many storage servers with one or more data stores. The storage servers may be configured by the cloud hosting company in one or more designated data centers. However, certain types of data in the centralized data store may all be formatted differently, in such a manner that the data itself is not readily usable by a wide range of employees in the company. While the data can be transformed into a different format before being stored at the centralized data store, such a pre-emptive transformation of the data often requires a lengthy, computation intensive process.

SUMMARY

In an embodiment, disclosed herein is a method performed by a data integration server for automatically integrating data from a source database to a target database. The method comprises receiving, from a user equipment via a server-to-user equipment application programming interface, a request to store a source file in a target database as a target file compatible with the target database, wherein the request comprises metadata describing the source file, a source database storing the source file, and the target database, determining, by an integrator application of the data integration server, a source file format of the source file based on the metadata, determining, by the integrator application, a target file format of the target file based on the metadata, wherein the target file format is compatible with the target database, determining, by the integrator application, a data loading application of a plurality of data loading applications in the data integration server based on at least one of the target file or the target database, automatically generating, by the integrator application, an integrated script based on a plurality of pre-defined scripts, the metadata, the source file format, and the target file format, wherein the integrated script comprises a set of instructions that, when executed, obtain the source file from the source database, transform the source file from the source file format to the target file format to obtain the target file, and load the target file to the target database using the determined data loading application, and executing, by the integrator application, the integrated script.

In another embodiment, disclosed herein is a method performed by a data integration server for automatically integrating data from a source database to a target database. The method comprises receiving, from a user equipment via a server-to-user equipment application programming interface, a request to store a source file in a target database, wherein the request comprises metadata describing the source file, a source database storing the source file, and the target database, determining, by an integrator application of the data integration server, a source file format of the source file based on the metadata, determining, by the integrator application, the target file format of the target file, wherein the target file format is compatible with the target database based on the metadata, automatically generating, by the integrator application, an integrated script based on a plurality of pre-defined scripts, the metadata, the source file format, and the target file format, wherein the integrated script comprises instructions that, when executed, obtain the source file from the source database, transform the source file from the source file format to the target file format to obtain the target file, and load the target file to the target database, executing, by the integrator application, the integrated script to obtain the source file from the source database and transform the source file from the source file format to the target file format to obtain the target file, validating, by an audit, balance, and control application of the data integration server, data in the target file, and executing, by a data loading application of the data integration server, the integrated script to load the target file to the target database only in response to the data in the target file being validated.

In yet another embodiment, disclosed herein is a system for automatically integrating data from a source database to a target database. The system comprises the source database comprising a source file, the target database, and a data integration computer system coupled to the source database and the target database. The data integration computer system comprises one or more processors, one or more non-transitory memories coupled to the one or more processors, a server-to-user equipment application programming interface configured to receive a request to store the source file in the target database as a target file compatible with the target database, wherein the request comprises metadata describing the source file, the source database, and the target database, an integrator application stored in one of the one or more non-transitory memories that, when executed by one of the one or more processors, cause the one of the one or more processors to determine a source file format of the source file based on the metadata, determine a target file format of the target file, wherein the target file format is compatible with the target database based on the metadata, obtain a plurality of scripts based on the metadata, the source file format, and the target file format, wherein the scripts comprise pre-defined instructions that, when executed, obtain the source file from the source database, transform the source file from the source file format to the target file format to obtain the target file, and load the target file to the target database, automatically generate an integrated script based on the scripts, and execute the integrated script to, obtain, by the integrator application, the source file from the source database, and transform, by the integrator application, the source file from the source file format to the target file format to obtain the target file. The data integration computer system further comprises a data loading application stored in one of the one or more non-transitory memories that, when executed by one of the one or more processors, cause the one of the one or more processors to load the target file to the target database.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
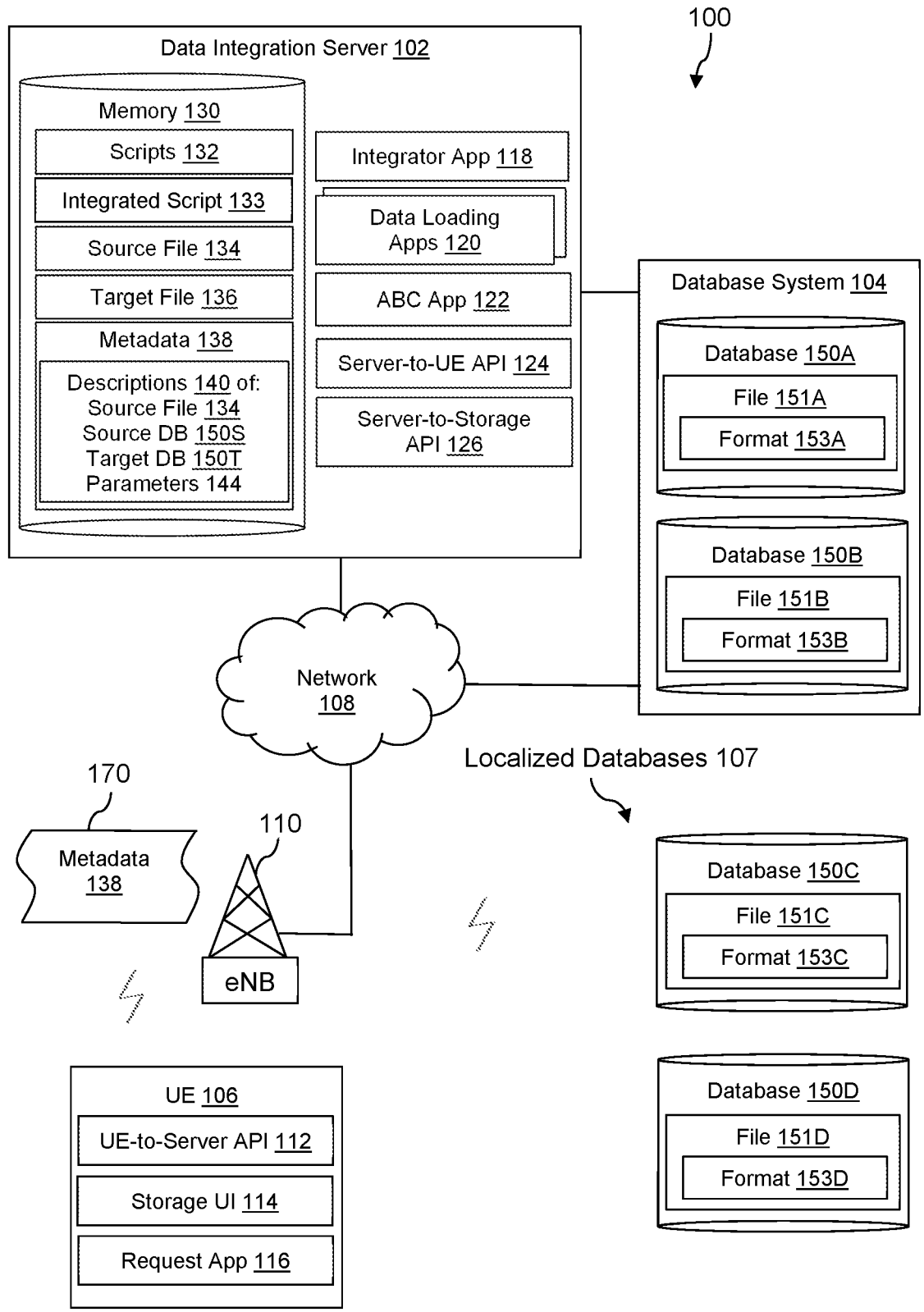
FIG. 1 is a block diagram of a system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

As mentioned above, service providing companies are increasingly migrating and integrating data from localized databases, owned and operated by the service provider itself, to a remote, centralized database system, which may be owned and operated by a third-party hosting company. In some cases, the centralized database system may include one or more storage servers positioned in a cloud computing environment and operated by third party cloud hosting companies. Each of these cloud hosting companies may include respective applications that provide database management and analytic related services on the data being stored. The centralized database system may logically store the data received from various local databases into one or more databases. A database refers to an organized collection of data that may be stored across one or more servers in the centralized database system, when the centralized database system is implemented similar to a data center.

There may be two scenarios in which the service providing company migrates and attempts to integrate data from localized databases to the centralized database system. In one scenario, different teams within a single company may simply forward data from the localized database to the centralized database system, without further processing or converting the data in any manner. This may lead to the centralized database system storing large amounts of data for different teams, often into different silos in the centralized database system. The data from the different teams may be similar types of data that are formatted differently. Therefore, the data stored at the centralized database system may not be readily accessible and usable universally across the different teams in the company.

In another scenario, employees of the company may first manually create the software (e.g., instructions or code) that, when executed, automatically reformats the data into a standard format accepted by the centralized database system prior to storing the data in the centralized database system. In particular, employees may need to examine the data, compare the format of the data with the format accepted by the centralized database system, and then manually generate the software that is executed by a computing device to reformat the data. This process typically involves numerous hours of manual data analysis, software development, testing, and production to transform and load data to the centralized database system. In addition, this process may be redundant because the instructions used to transform the format of data may be unnecessarily generated numerous times for similar types of data. Therefore, the centralized database system may store vast amounts of inaccessible or unusable data stored in unrecognizable formats.

The embodiments disclosed herein seek to resolve the foregoing problems by providing a data integration server responsible for automatically integrating a source file from a source database into a target database of the centralized database system, after transforming the source file into a target file. A source file may be any type of file including unformatted raw data that is not compatible with the target database. A target file is a transformed version of the source file, formatted in a manner compatible with the target database. For example, the source file may be a file encoded in a WINDOWS format, and the target database may only support files formatted according to UNIX. The source database may be a localized database, a database within the centralized database system, or the target database itself.

In an embodiment, a user equipment (UE) of a user within a team of the company may provide, to the data integration server, a request to load the source file from the source database into the target database. In an embodiment, the request includes metadata describing the source file, the source database, and/or the target database. For example, the metadata may comprise a name or location of the source file, the source database, and the target database. The data integration server may be triggered to automatically integrate the source file into the target database as the target file upon receiving the request.

An integrator application of the data integration server may determine, based on the metadata in the request, the format of the source file. The integrator application may then examine the target database to determine the format of data compatible with the target database. The integrator application may then obtain (e.g., generate or select) scripts including instructions or code that may be used to transform the source file into the target file based on the metadata, the format of the source file, and the format of the target database. The scripts, when executed, may be used to obtain the source file from the source database, transform (e.g., convert) the source file to the format compatible with the target database to obtain the target file, and load (e.g., send for storage) the target file to the target database. In an embodiment, the integrator application may automatically generate an integrated script based on the obtained scripts, in which the scripts may be modified or stitched together based on inputs, outputs, and conditions imposed on the outputs, as further described herein.

In an embodiment, the data integration server may include different data loading applications, which may each be used differently to load data to the target database. Each data loading application may load data into the target database, for example, at a different speed, at a different transmit power, in a different manner (e.g., in parallel or sequentially to maintain order), with a different security level or application, etc. For example, one data loading application may be used to load data into an empty database, another data loading application may be used for mini-batch loading, another data loading application may be used for high speed bulk loading, etc. For example, one or more data loading applications may be considered high performance data loading applications, that may be used to load data that is more critical or sensitive in nature. One or more data loading applications may include additional security features (e.g., encryption) that are added to the data before being loaded. One or more data loading applications may be used to load data sequentially in a particular order using one channel, which maintains accuracy of the data. Another data loading application may load data using in parallel using many channels, which is a far more efficient method of loading. In an embodiment, the integrator application may determine an optimal data loading application based on the target file to be loaded to the target database, to ensure the most efficient use of the computing and networking resources while loading.

In an embodiment, the data integration server may further include an audit, balance, and control (ABC) application, which may be used to validate data in the target file prior to loading the target file to the target database. The ABC application may perform an audit of the records being converted from the source file to the target file, for example, by maintaining a log of all the operations performed on the source file and/or the target file. For example, the log may indicate start/end times of each task in the job, number of rows processed, inserted, updated, and rejected/deleted in each step, types of errors and warnings, etc. The detailed log may enable the system to investigate production issues, analyze performance trends, and provide further automation as necessary during the data integration process disclosed herein.

The ABC application may perform balance operations, for example, by recording the difference between the source file and the target file in each step of the process during transformation of the source file to the target file (i.e., each time data is copied, moved, and/or transformed). In each step of the process, the ABC application may compare records in the target file with records in the source file to ensure that the source file has been accurately transformed into the target file. For example, the ABC application may compare a quantity of records in the target file with a quantity of records in the source file to determine whether records in the source file have been properly transformed into the target file. Other basic metrics may also be compared, such as for example, a sum of numeric counts and/or row counts by key columns. In another case, the ABC application may compare the content of one or more the records in the target file with the content of one or more records in the source file to determine whether records in the source file have been properly transformed into the target file. In addition, the ABC application may also run a set of business rules on the target file to perform a quality check on the target file. The balance operations may help ensure data quality and integrity at each step of the process, and may also with data reconciliation if necessary.

The ABC application may also perform control operations, which relate to restartability, except handling, scheduling, and automation in general with reference to the data integration methods disclosed herein. The ABC application may control the restart ability of the integration process, which enables the integration process to be more flexible and intelligent in restarting integration from a last point of failure rather than restarting the integration process from the beginning. The ABC application may also perform exception handling by catching, notifying, and automatically correcting, to the extent possible, all types of exceptions. The ABC application may be responsible for managing the quality of the data, which relates to the exception handling capabilities of the system.

In this way, the ABC application may function to ensure the validity of the data being transformed in the source file to the target file during each step of the transformation. In an embodiment, the ABC application performs the audit, balance, and control operations above during the integration process, and at the end of the transformation process, determines whether the transformed target file is valid. In an embodiment, the target file may only be permitted to be loaded to the target database when the target file has been validated by the ABC application.

Therefore, by validating the data before loading the data, the embodiments disclosed herein reduce the storage of corrupted files, thereby saving storage resources within the database system. In addition, the use of particular data loading applications to load particular types of data into the centralized database system is a far more resource efficient manner of integrating data into a database system. Lastly, the embodiments disclosed herein automate the integration of data in response to receiving a request with metadata describing the source file, thereby saving networking and computing resources.

Turning now to FIG. 1, a system 100 is described. The system 100 comprises a data integration server 102, a database system 104, one or more user equipment (UEs) 106, one or more localized databases 107, a network 108, and a cell site 110. The cell site 110 may provide the UE 106 a wireless communication link to the network 108, data integration server 102, and/or database system 104 according to a 5G, a long term evolution (LTE), a code division multiple access (CDMA), or a global system for mobile communications (GSM) wireless telecommunication protocol. In this way, the UE 106 may be communicatively coupled to the network 108, data integration server 102, and/or database system 104 via the cell site 110.

The UE 106 may be a cell phone, a mobile phone, a smart phone, a personal digital assistant (PDA), an Internet of things (IoT) device, a wearable computer, a headset computer, a laptop computer, a tablet computer, or a notebook computer. In an embodiment, the UE 106 may be owned and operated by a user of a team or subdivision within a service providing company. For example, UE 106 may be part of the billing subdivision.

UE 106 may include a UE-to-server application programming interface (API) 112, a storage UI 114, and a request application 116. The UE-to-server API 112 may be an interface implemented using a set of functions that support establishment, maintenance, and communication via a wireless connection between UE 106 and either the data integration server 102 and/or the database system 104, for example, using the cell site 110. The request application 116 may be an application by which the user can access information regarding the data stored at the database system 104 and generate requests to load data to the database system 104. The storage UI 114 may be a user interface managed by the request application 116. The user may enter user input into the storage UI 114 to generate the request to load data to the database system. As should be appreciated, UE 106 may include other APIs, applications, UIs, and data not otherwise shown in FIG. 1.

The network 108 may be one or more private networks, one or more public networks, or a combination thereof. In an embodiment, the UE 106 may be connected to the network 108 via a WiFi connection or via a wired communication link (e.g., a local area network (LAN) connection in an enterprise network). In an embodiment, the data integration server 102 and the database system 104 may be part of the network 108, but are illustrated separately in FIG. 1 to further clarify the present disclosure. In an embodiment, the network 108 may include a cloud computing environment provided by a host, and the cloud computing environment includes the data integration server 102 and the database system 104. In this embodiment, the service provider associated with UE 106 may reserve cloud computing resources to implement the components within the data integration server 102 and the database system 104 on behalf of the service provider. The service providers may use the resources for the storage of data in the database systems 104, and perform operations at the database systems using the database systems 104.

The database system 104 may be implemented as a computer system, which is described further herein. In an embodiment, the database system 104 provides access to one or more databases that store customer data owned by various customers, such as the service provider associated with UE 106. The databases may include one or more hardware devices, such as, for example, non-transitory memories, hard drives, solid state memories, or any other type of memory capable of storing large amounts of data. In this case, the database includes primarily hardware with data storage capabilities, but may also include processing servers as well. For example, the databases may be implemented as a data center, with a group of distributed memories used for remote storage, processing, and distribution of large amounts of data.

In an embodiment, the database system 104 is part of the databases such that a processing server (e.g., processor) in the databases implements the functions of the database system 104 described herein. In another embodiment, the database system 104 and the databases are separate and distinct entities, in which the database system 104 and the databases are coupled together in a wireless or wired manner. In this embodiment, the database system 104 may communicate with the databases to implement the functions of the database system 104 described herein. The term "database system 104" as used herein should be understood to refer to both the database system 104 (e.g., the server providing access to the customer data) and the databases storing customer data.

As shown in FIG. 1, the database system 104 includes one or more databases 150A-B, which may store the customer data. As described above, a database 150A-B refers to an organized collection of data that may be stored across one or more of the servers in the database system 104. In some cases, the different databases may be logical separations of data, the different databases may be physical separations of data (e.g., different databases are located at different servers), or the different databases may be operated by different hosting companies or applications (e.g., MICROSOFT AZURE, AMAZON WEB SERVICES (AWS), SNOWFLAKE, TERADATA, ORACLE, etc.). For example, different databases 150A-B might store data on behalf of different subdivisions of the service providing company. While FIG. 1 shows the databases 150A-B within the database system 104, it should be appreciated that database 150A and 150B may be stored on different servers within the database system 104, or in different database systems 104 located separate from one another. In addition, while only two databases 150A-B are shown in FIG. 1, it should be appreciated that the database system 104 may include any number of databases.

The database 150A includes a file 151A having a format 153C. The database 150B includes a file 151B having a format 153B. The files 151A-B may be any type of file, such as, for example, MICROSOFT files, UNIX, files, video files, image files, audio files, or tables. The tables may be files that are compressed or otherwise formatted as a table. For example, the tables may be delta lake files (hereinafter referred to as "delta files"), comma separated value (CSV) files, parquet files, or any other file that is encoded in the form of a table. Delta files are encoded according to Delta Lake, which is an open source project that enables building a Lakehouse architecture on top of data lakes. Delta files may include a proprietary format used in various cloud data platforms, such as, for example, DATABRICKS. Parquet files have an open source file format available to any project in a HADOOP ecosystem supported by APACHE. CSV files are comma separated variable files. While the databases 150A-B in FIG. 1 only includes a single file 151A-B, it should be appreciated that each of the databases 150A-B may include any number of files 151A-B.

The file 151A may be encoded according to the format 153A, and the file 151B may be encoded according to the format 153B. For example, when file 151A is a table, a format 153A of the table may be a delta file. As another example, when the file 151B is a column of a table indicating a date, the format 153B may be MONTH DAY, YEAR.

In some embodiments, the files 151A-B may be formatted according to a database management system operating the databases 150A-B in the database system 104. For example, the database management systems may be one or more of ORACLE, SNOWFLAKE, TERADATA, POSTGRESQL, MYSQL, SQLSERVER, or any other database management system, each of which may also have a corresponding data warehouse to store data.

In one case, a single database management system may operate all the databases 150A-B in the database system 104. In another case, database 150A may be operated by one database management system, while database 150B may be operated by another database management system. Either way, the files 151A-B in the databases 150A-B may be formatted according to the respective database management system. For example, if the database management system operating database 150A requires files 151A to be formatted in the form of tables, the format 153A of the files 151A indicates a table format. In some cases, the databases 150A-B are unstructured, in which the databases 150A-B are not operated by a database management system. In this case, the files 151A-B in the databases 150A-B may be any type of file, such as, for example, JAVASCRIPT OBJECT NOTATION (JSON) format, parquet, Extensible Markup Language (XML), etc.

The localized databases 107 may include databases 150C-D, which may be similar to databases 150A-B, in that databases 150C-D are databases, or data stores, including one or more hardware devices, such as, for example, non-transitory memories, hard drives, solid state memories, or any other type of memory. The databases 150C-D may be geographically remote from the UE 106 and/or the database system 104. For example, the databases 150C-D may be stored locally within a building owned by the service provider, or the databases 150C-D may be stored in a remote server farm. Each database 150C-D may store data for a particular team of the service providing company. For example, database 150C may be associated with a billing team of the service providing company while database 150D may be associated with a customer care team of the service providing company.

As shown in FIG. 1, database 150C includes file 151C having a format 153C. Similarly, database 150D includes a file 151D having a format 153D. While the databases 150C-D in FIG. 1 only includes a single file 151C-D, it should be appreciated that each of the databases 150C-D may include any number of files 151C-D. The databases 150C-D may be operated by different databases management systems, or may be an unstructured database. The format 153C-D of the files 151C-D in databases 150C-D is based on the format compatible with the respective database management system.

The data integration server 102 may also be implemented as a computer system, which again is described further herein. In an embodiment, the data integration server 102 receives a request 170 from the UE 106 to integrate a source file 134 from one of the source databases 150A-D to a target database 150A-B in the database system 104. As further described herein, this may be performed by automatically transforming the source file 134 to a target file 136 compatible with the target database 150A-B. The request 170 may include metadata 138, which the data integration server 102 uses to integrate the source file 134 to the target database 150A-B as the target file 136. The contents of the metadata 138 may be stored in the data integration server 102 and are further described below.

The data integration server 102 may include a non-transitory memory 130, storing scripts 132, an integrated script 133, the source file 134, the target file 136, and the metadata 138. The scripts 132 may include pre-defined instructions, code, logic, parameters, or libraries that, when executed by one or more processors of the data integration server 102, cause the processors to automatically obtain the source file 134, transform the source file 134 into the target file 136, and load the target file 136 into the target database 150T. As further described herein, the integrated script 133 may include one or more scripts 132 that have been modified and/or combined for reformatting a source file 134 into a target file 136 and loading the target file 136 into a database 150A-B. The integrated script 133 may be based on the scripts 132, the metadata 138, and the format of the source file 134 and the target file 136. The source file 134 may be a file 151A-D stored across any one of the databases 150A-D in system 100 (hereinafter referred to as the "source database 150S"). The target file 134 may be a file 151A-B stored in one of the databases 150A-B in the database system 104 (hereinafter referred to as the "target database 150T"). In this way, the source database 150S may be in the localized databases 107 or in the database system 104, and the target database 150T is in the database system 104.

The metadata 138 received in the request 170 may include descriptions 140 used to integrate the source file 134 to the target database 150A-B as the target file 136. The metadata 138 may include descriptions 140 of the source file 134, the source database 150S (shown as "source DB 150S" in FIG. 1), the target database 150T (shown as "target DB 150T in FIG. 1), and various other parameters 144.

The parameters 144 may indicate additional instructions for performing the transformation of the source file 134 to the target file 136 and loading the target file 136 to the target database 150T. For example, the parameters 144 indicate at least one of the following: that the source file 134 is to be decompressed before processing, that the source file 134 is to be decrypted prior to creating the target file 136, that the target file 136 is to be encrypted prior to being loaded to the target database 150T, that some fields of data in the target file 136 and/or in the target data base 150T are to be encrypted with a specified encryption technology, that the target file 136 is to be compressed prior to being loaded to the target database 150T, that the target file 136 is to be validated prior to being loaded to the target database 150T, that the source file 134 is to be transformed using a duplicate file to prevent corrupting the source file 134, that a manifest for the target file 136 is to be generated, validated, and/or loaded to the target database 150T with the target file 136, that the target file 136 is to be loaded to the target database 150T with password protection, that the source file 134 is to be processed to remove invisible lines in the source file 134, that zero-byte processing should be performed on the source file 134 (e.g., presenting users options when the source file 134 is empty), that the target file 136 is to be split into separate files before being loaded to the target database 150T, or that the target file 136 is to be archived into a local datastore before being loaded to the target database 150T. A manifest may refer to a file that is created when objects are written to an external object store (e.g., database system 104), and the manifest file lists paths of objects stored on the external object store. In an embodiment, the manifest and/or manifest file may include other details like a file name, a checksum value, and a record count. An invisible line refers to an invisible line break command or character in the source file 134, which creates one or more empty lines not containing any data in the source file 134. For example, an invisible line may not be visible to a human reader of the source file 134 when the source file 134 is presented on a display screen by a text editor or other file manipulation tool. Zero-byte processing may refer to the processing that is triggered to occur when the system obtains a zero-byte file (e.g., a file that does not contain any data) as the source file 134.

The data integration server 102 may execute an integrator application 118, one or more data loading applications 120, an ABC application 122, a server-to-UE API 124, and a server-to-storage API 126. The integrator application 118 may determine, based on metadata 138, the format 153A-D (hereinafter referred to as "format 153") of the source file 134 and examine the target database 150T to determine the format 153 of data compatible with the target database 150T. The integrator application 118 may then obtain or generate the scripts 132 to receive the source file 134, to transform the source file 134 into the target file 136, and to load the target file 136 into the target database 150T. As further described herein, the integrator application 118 may obtain one or more scripts 132 that are pre-stored in, for example, a data store accessible to the integrator application 118. In some embodiments, the integrator application 118 may modify the scripts 132 as necessary and/or combine the scripts 132 based on a pipeline of different scripts 132 to obtain an integrated script 133. The integrator application 118 may execute the code in the integrated script 133 to receive the source file 134, to transform the source file 134 into the target file 136, and to load the target file 136 into the target database 150T. The data loading applications 120 may each be different applications used to load different types of target files 136 or different sizes of target files 136 to the target database 150T. The ABC application 122 may validate the target file 136 prior to loading the target file 136 to the target database 150T.

The server-to-UE API 124 may be an interface implemented using a set of functions that support establishment, maintenance, and communication via a wireless connection between the data integration server 102 and UE 106, for example, using the cell site 110. The server-to-storage API 126 may be an interface implemented using a set of functions that support establishment, maintenance, and communication via a connection between the data integration server 102 and the database system 104, for example, using the cell site 110, the network 108, or a wired link. As should be appreciated, the data integration server 102 may include other applications, data, and APIs not otherwise shown in FIG. 1.

As should be appreciated, the system 100 may include other components not shown in FIG. 1. The operations performed by the data integration server 102, database system 104, and UE 106 to integrate and load the source file 134 to the target database 150A-B as the target file 136 will be further described below with reference to FIGS. 2, 3, 4, and 5.

Figure 2:
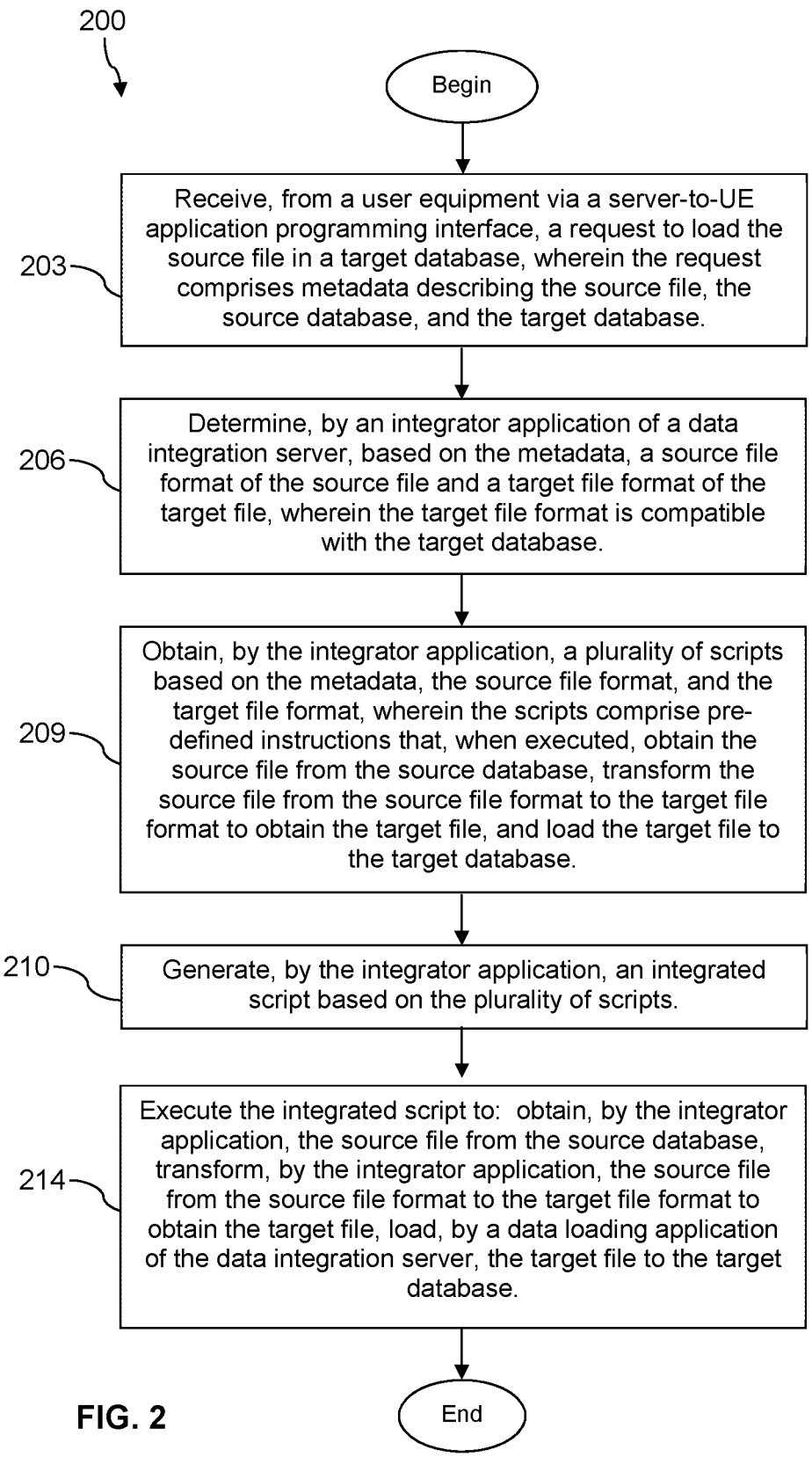
FIG. 2 is a flow chart of a first method performed by the data integration server in the system of FIG. 1 to integrate data into a database system of FIG. 1 according to an embodiment of the disclosure.

Referring now to FIG. 2, a method 200 is described. In an embodiment, the method 200 is a method for integrating and loading the source file 134 to the target database 150A-B as the target file 136. The method 200 may be performed by the data integration server 102, in communication with the UE 106 and the database system 104.

At step 203, method 200 comprises receiving, from the UE 106, via the server-to-UE API 124, the request 170 to load a transformed version of the source file 134 to the target database 150T. The request 170 includes one or more of the metadata 138 described above. In an embodiment, the metadata 138 in the request 170 only describes the source file 134 and the target database 150T. In this embodiment, the user only needs to provide minimal information for the data integration server 102 to process the request 170, which thereby also minimizes the amount of data forwarded through the network to process this request 170.

For example, the request application 116 of UE 106 may display a page on the storage UI 114 for the user to enter a user input corresponding to the request 170 (e.g., enter the metadata 138). The user input may be a selection of at least one of the source file 134, the source database 150S, the target database 150T, formats 153 of the source file 134 and target file 136, or any of the parameters 144 discussed above.

At step 206, method 200 comprises determining, by the integrator application 118, a format 153 of the source file 134 and a format 153 of the target file 136 based on the metadata 138. In an embodiment, the integrator application 118 determines a format 153 of the source file 134 (also referred to herein as the "source file format 153") based on the source database 150S indicated in the request 170. For example, the integrator application 118 may obtain the location of the source file 134 or the source database 150S from the metadata 138, and then either exchange messages with the source database 150S or examine the source database 150S to obtain (e.g., receive or determine) the source file format 153. Alternatively, the integrator application 118 may perform a look up on a pre-defined mapping of databases 150A-D and respective formats 153, in which the mapping is accessible to the integrator application 118, to obtain the source file format 153. In another embodiment, the source file format 153 may be indicated in the metadata 138 of the request 170.

Similarly, the integrator application 118 determines a format 153 of the target file 136 (also referred to herein as the "target file format 153") based on the target database 150T. The integrator application 118 may determine the target file format 153 directly from the metadata 138 in the request 170, from a pre-defined mapping, by exchanging messages with the database system 104, or examining the target database 150T.

At step 209, method 200 comprises automatically obtaining, by the integrator application 118, the scripts 132 based on the metadata 138 in the request 170, the source file format 153, and the target file format 153. The scripts 132 may include pre-defined instructions that, when executed, perform the steps of obtaining (e.g., extracting or receiving) the source file 134 from the source database 150S, transforming (e.g., converting) the source file 134 from the source file format 153 to the target file format 153, and loading the target file 136 to the target database 150T.

For example, the integrator application 118 may select an extractor that may be used to obtain the source file 134 from the source database 150A. The integrator application 118 may then examine the source file 134 to determine the format(s) of the data in the source file 134 that need to be transformed into the target file format 153.

The integrator application 118 may then search through the scripts 132 to determine the particular scripts 132 that are to be used to transform the data in the source file 134 into the target file format 153. For example, the scripts 132 may be stored at a local memory accessible to the data integration server 102 in a mapping format (e.g., {transform S to Y, script X; transform A to B, script B, etc.}). In this way, the integrator application 118 may easily and automatically determine the scripts 132 to be used to completely transform the format 153 of the source file 134 to the format 153 of the target file 136.

In some cases, the metadata 138 in the request 170 indicates one or more other parameters 144 by which the source file 134 is to be transformed into the target file 136 and loaded into the target database 150T. In these cases, step 209 may include obtaining additional scripts 132 used to process the request 170 according to the parameters 144.

For example, when the parameter 144 indicates that the source file 134 is compressed, step 209 may include obtaining the script 132 to decompress the source file 134. For example, when the parameter 144 indicates the source file 134 is encrypted, step 209 may include obtaining the script 132 and/or decryption key(s) to decrypt the source file 134. For example, when the parameter 144 indicates that the target file 136 is to be encrypted prior to being loaded to the target database 150T, step 209 may include obtaining the script 132 and/or encryption key(s) used to encrypt the target file 136 according to an encryption scheme prior to loading. Similarly, when the parameter 144 indicates that the target file 136 is to be loaded to the target database 150T with password protection, step 209 may include obtaining the script 132 used to enforce password protection on the target file 136 prior to loading. When the parameter 144 indicates that the target file 136 is to be compressed prior to being loaded to the target database 150T, step 209 may include obtaining the script 132 to compress the target file 136 according to a compression scheme prior to loading.

When the parameter 144 indicates that the source file 134 is to be transformed using a duplicate file to prevent corrupting the source file 134, the script 132 used to obtain the source file 134 from the source database 150S may instruct the source database 150S to provide a copy of the source file 134 instead of the original raw source file 134. When the parameter 144 indicates that the target file 136 is to be archived into a local datastore before being loaded to the target database 150T, step 209 may include obtaining the script 132 to archive the target file 136 locally before loading to the target database 150T. When the parameter 144 indicates that the source file 134 is to be processed to remove invisible lines in the source file 134, step 209 may including obtaining the script 132 to remove invisible lines (e.g., empty lines) from the source file 134 before changing the format 153 of the source file 134. When the parameter 144 indicates that the target file 136 is to be split into separate files before being loaded to the target database 150T, step 209 may include obtaining the script 132 to split the target file 136 into separate files according to a maximum file size requirement of the target database 150T, and numbering the separate files to facilitate processing upon reception. When the parameter 144 indicates that zero-byte processing should be performed on the source file 134, step 209 includes obtaining the script 132 for notifying the user when the source file 134 is empty and to provide the user with other options.

As another example, the parameters 144 may indicate that a manifest for the source file 134 is to be validated and/or a manifest for the target file 136 is to be generated for the target file 136 and loaded to the target database 150T with the target file 136. As described above, a manifest may refer to a file that is created when objects are written to an external object store (e.g., database system 104), and the manifest file lists paths of objects stored on the external object store. In this case, the parameters 144 may instruct the integrator application 118 to obtain scripts 132 to generate or validate the manifest file related to one or more target files 136 before loading, and the scripts 132 may be executed accordingly.

In another embodiment, instead of selecting pre-stored scripts 132 as described above, the integrator application 118 may automatically generate the scripts 132. The scripts 132 may be generated based on pre-configured coding functions using the metadata 138 in the request 170, the source file format 153, and the target file format 153. For example, the integrator application 118 may automatically generate the script 132 for extracting the source file 134 from the source database 150S based on prior knowledge of the source database 150S. The integrator application 118 may automatically generate the script 132 for transforming the source file 134 into the target file 136 based on the formats 153 of the source file 134 and the target file 136. Lastly, the integrator application 118 may automatically generate the script 132 for loading the target file 136 into the target database 150T based or prior knowledge of methods of loading data into the target database 150T.

At step 210, method 200 comprises generating an integrated script 133 based on the scripts 132 that were either obtained or generated at step 209. In embodiment, the integrated script 133 includes a pipeline of the scripts 132 and is arranged sequentially based on at least one of an input of each script, an output of each script, or a condition imposed on outputs of one or more of the scripts 132.

In an embodiment, the integrator application 118 may arrange one or more of the scripts 132 obtained at step 209 into a pipeline of execution. For example, an output of a first script 132 may be fed into an input of a second script 132, an output of the second script 132 may be fed into the input of a third script 132, an output of a third script 132 may be fed into the input of a fourth script 132, and so on. As another example, an output of a third script 132 and an output of a seventh script 132 may both be input for a tenth script 132. Similarly, an output of a first script 132 may be provided as input into many other scripts 132. In this way, the integrator application 118 may determine the inputs and outputs for each of these scripts 132 and how they relate together to obtain the pipeline of scripts 132, or combination of scripts 132, which together form the integrated script 133.

In addition, the integrator application 118 may generate the integrated script 133 as a tree format with different branches, which indicates that a different sequence of scripts 132 may be performed based on whether different conditions are met. For example, the integrator application 118 may impose conditions on an output of a first script 132 to determine a second script 132 that may receive the output of the first script 132 as an input. For example, the integrator application 118 may determine whether an output of a first script 132 meets a condition (e.g., a file size exceeds a threshold). If so, the integrator application 118 determines that the output of the first script 132 should be provided as input for a second script 132. If not, the integrator application 118 determines that the output of the first script 132 should be provided as input for a third script 132, different from the second script 132. In this way, the integrator application 118 may generate the integrated script 133 based on the inputs and outputs of the scripts 132 and pre-defined conditions imposed on the outputs of one or more of the scripts 132. The integrated script 133, when executed by the data integration server 102, may be used to extract the source file 134 from the source database 150S, transform the source file 134 into the target file 136, and load the target file 136 into the target database 150T.

In an embodiment, the integrator application 118 may determine additional scripts 132 based on the parameters 144, as described above, and add the additional scripts 132 to the integrated script 133. In some cases, the integrator application 118 may modify the pre-stored scripts 132 as necessary before adding the scripts 132 to the integrated script 133.

At step 214, method 200 comprises executing the integrated script 133 to perform the steps of obtaining the source file 134 from the source database 150S, transforming the source file 134 to the target file 136, and loading the target file 136 to the target database 150T. In an embodiment, one of the data loading applications 120 may load the target file 136 to the target database 150T. For example, the data loading application 120 may send, to the database system 104 using the server-to-storage API 126, the target file 136 with an instruction indicating a destination as target database 150T.

Figure 3:
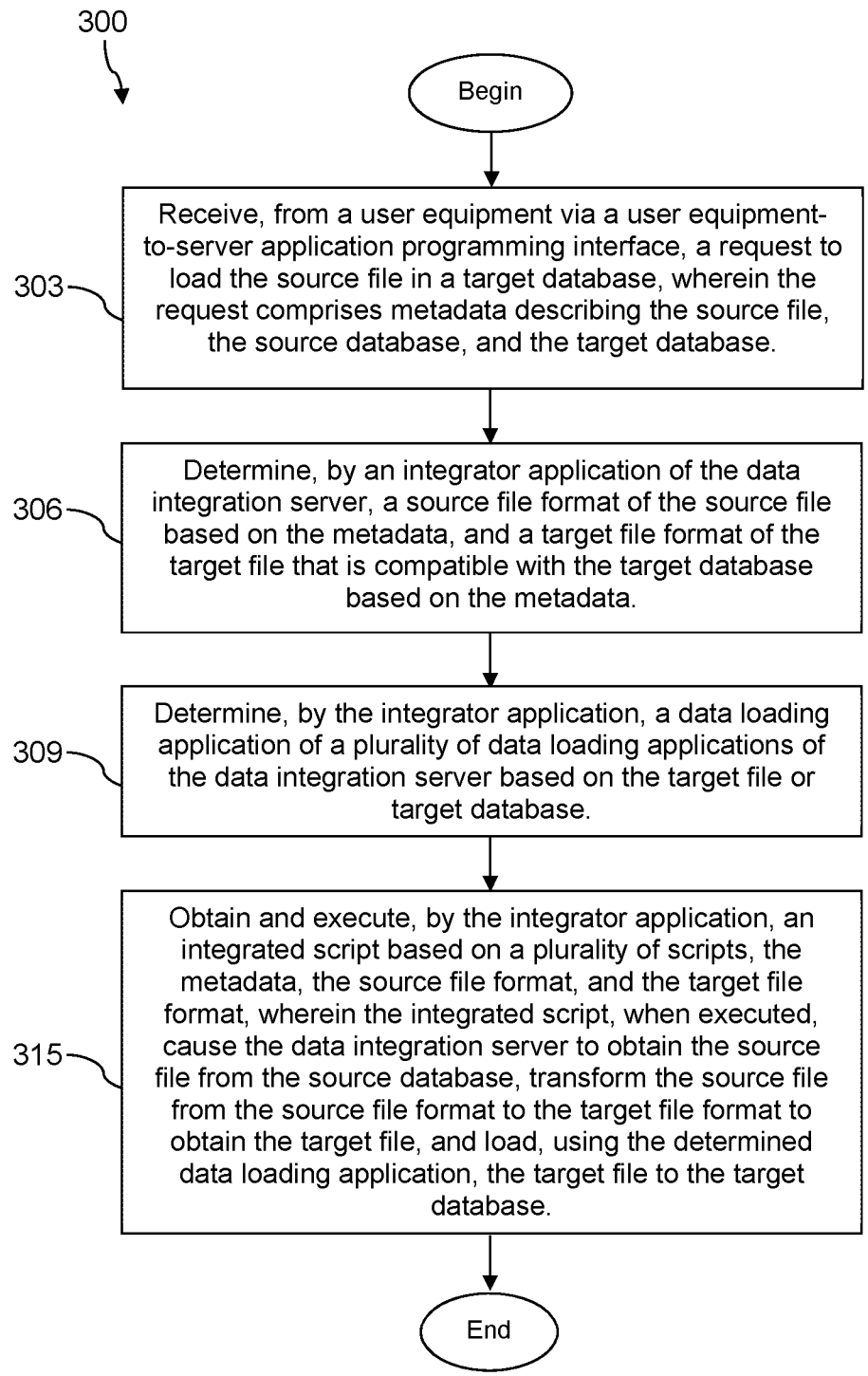
FIG. 3 is a flow chart of a second method performed by the data integration server in the system of FIG. 1 to integrate data into a database system of FIG. 1 according to an embodiment of the disclosure.

Turning now to FIG. 3, a method 300 is described. In an embodiment, the method 300 is a method for integrating and loading the source file 134 to the target database 150A-B as the target file 136. The method 300 may be performed by the data integration server 102, in communication with the UE 106 and the database system 104.

In an embodiment, steps 303 and 306 of method 300 are similar to steps 203 and 206 of method 200 described above with reference to FIG. 2. After determining the format 153 of the source file 134 and the target file 136, method 300 moves to step 309.

At step 309, method 300 comprises determining, by the integrator application 118, a data loading application 120, from the multiple data loading applications 120 of the data integration server 102 based on the target file 136 or the target database 150T. As mentioned above, the data loading applications 120 may each be different applications used to load different types of target files 136 or different sizes of target files 136 to the target database 150T. For example, a first data loading application 120 may be used to load target files 136 greater than or equal to a threshold size, a second data loading application 120 may be used to load target files 136 less than the threshold size. As another example, one data loading application 120 may be used to load data into an empty database, another data loading application 120 may be used for mini-batch loading, another data loading application 120 may be used for high speed bulk loading, etc. Each of the data loading applications 120 may be specifically configured to load the target file 136 to the target database 150T in the most resource efficient manner.

In an embodiment, the integrator application 118 may determine the data loading application 120 to load the target file 136 based on a size of the source file 134 and/or a size of the target file 136, a type of the target file 136, a method of loading the target file 136 to the target database 150T, a storage space (capacity available or space unavailable) of the target database 150T, or any details regarding the target database 150T.

Step 315 in method 300 is similar to steps 209, 210, and 214 in method 200, except that method 300 includes automatically generating the integrated script 133 based on a script 132 for loading the target file 136 to the target database 150T using the determined data loading application 120. In one embodiment, the integrator application 118 may automatically generate the code for loading the target file 136 to the target database 150T using the determined data loading application 120, and add this code to the integrated script 133. In another embodiment, the integrator application 118 may select the script 132 for loading the target file 136 to the target database 150T using the determined data loading application 120, modify the script 132 as needed, and add the script 132 to the integrated script 133. In step 315, method 300 includes executing the integrated script 133, similar to step 214 in method 200.

Figure 4:
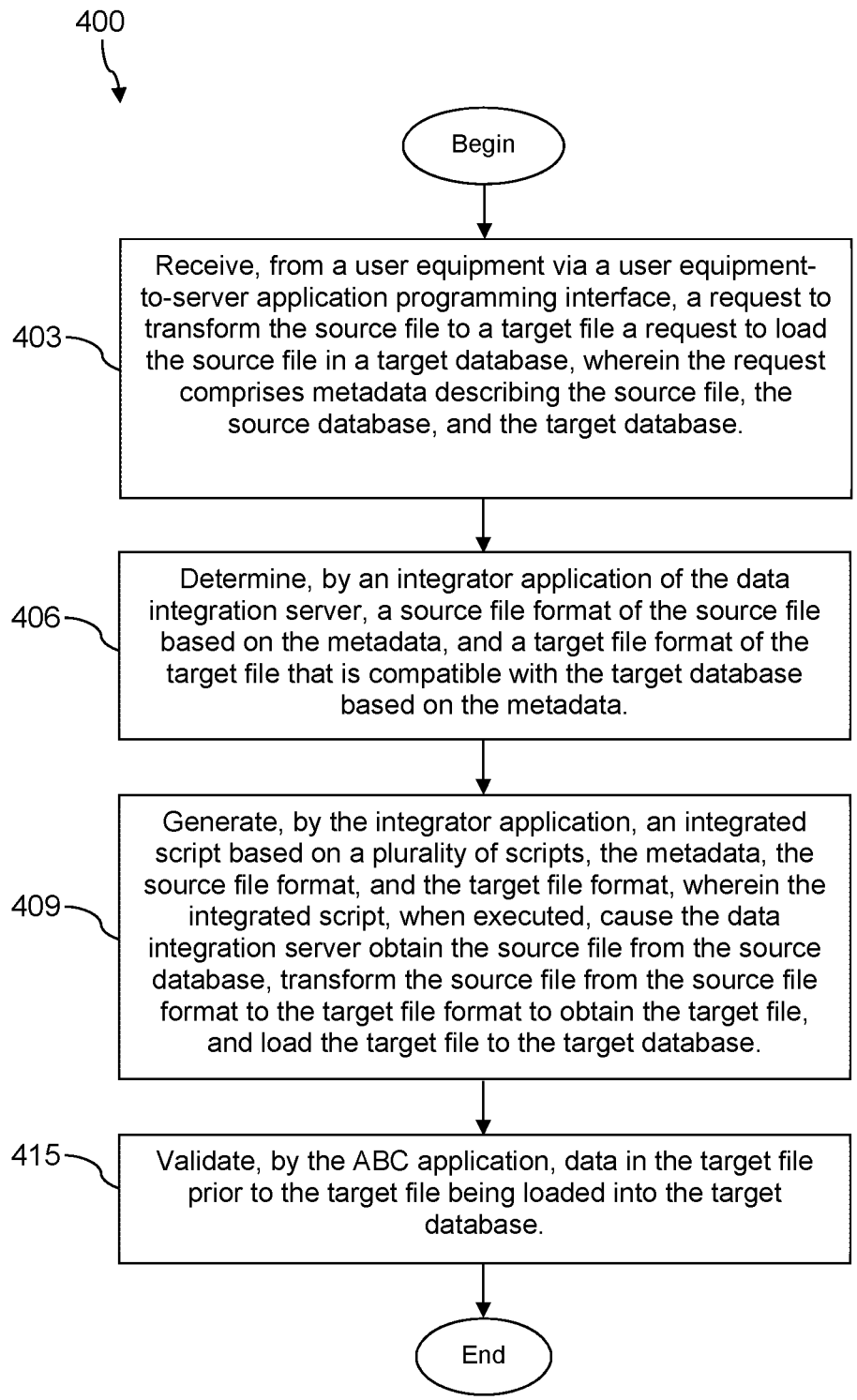
FIG. 4 is a flow chart of a third method performed by the data integration server in the system of FIG. 1 to integrate data into a database system of FIG. 1 according to an embodiment of the disclosure.

Turning now to FIG. 4, a method 400 is described. In an embodiment, the method 400 is a method for integrating and loading the source file 134 to the target database 150A-B as the target file 136. The method 400 may be performed by the data integration server 102, in communication with the UE 106 and the database system 104.

In an embodiment, steps 403, 406, and 409 of method 400 are similar to steps 203, 206, 209, and 210 of method 200 described above with reference to FIG. 2. After determining the format 153 of the source file 134 and the target file 136, and obtaining the scripts 132, method 400 may first execute the integrated script 133 to obtain the source file 134 from the source database 150S and transform the source file 134 from the source file format 153 to the target file format 153 to obtain the target file 136. Once the target file 136 is obtained, method 400 moves to step 415.

At step 415, method 400 comprises validating, by the ABC application 122, data in the target file 136 prior to the target file 136 being loaded into the target database 150T. In general, the ABC application 122 may perform the auditing, balancing, and controlling operations described above on the data being transformed and loaded to ensure that the target file 136 is not corrupted or invalid due to the transformation process. The ABC application 122 may audit the transformation of the source file 134 to the target file 136, which can then be validated, and corrected when necessary.

For example, to validate the target file 136, the ABC application 122 may compare a quantity of records in the target file 136 with a quantity of records in the source file 134 to ensure that the entire source file 134 has been fully converted into the target file 136. In addition, the ABC application 122 may also run a set of business rules on the target file 136 to perform a quality check on the target file 136. In some cases, the ABC application 122 may also validate the data itself (e.g., testing for valid phone numbers when the data include customer phone numbers). In some embodiments, the target file 136 may only be loaded to the target database 150T when the target file 136 is properly validated by the ABC application 122.

In an embodiment, the validation in step 415 may be performed based on parameters 144 in the metadata 138 of the request 170, indicating that the target file 136 is to be validated prior to being loaded to the target database 150T. In another case, the data integration server 102 may be pre-configured to validate all target files 136 according to step 415, without the need to obtain an additional script 132 for validation.

Figure 5:
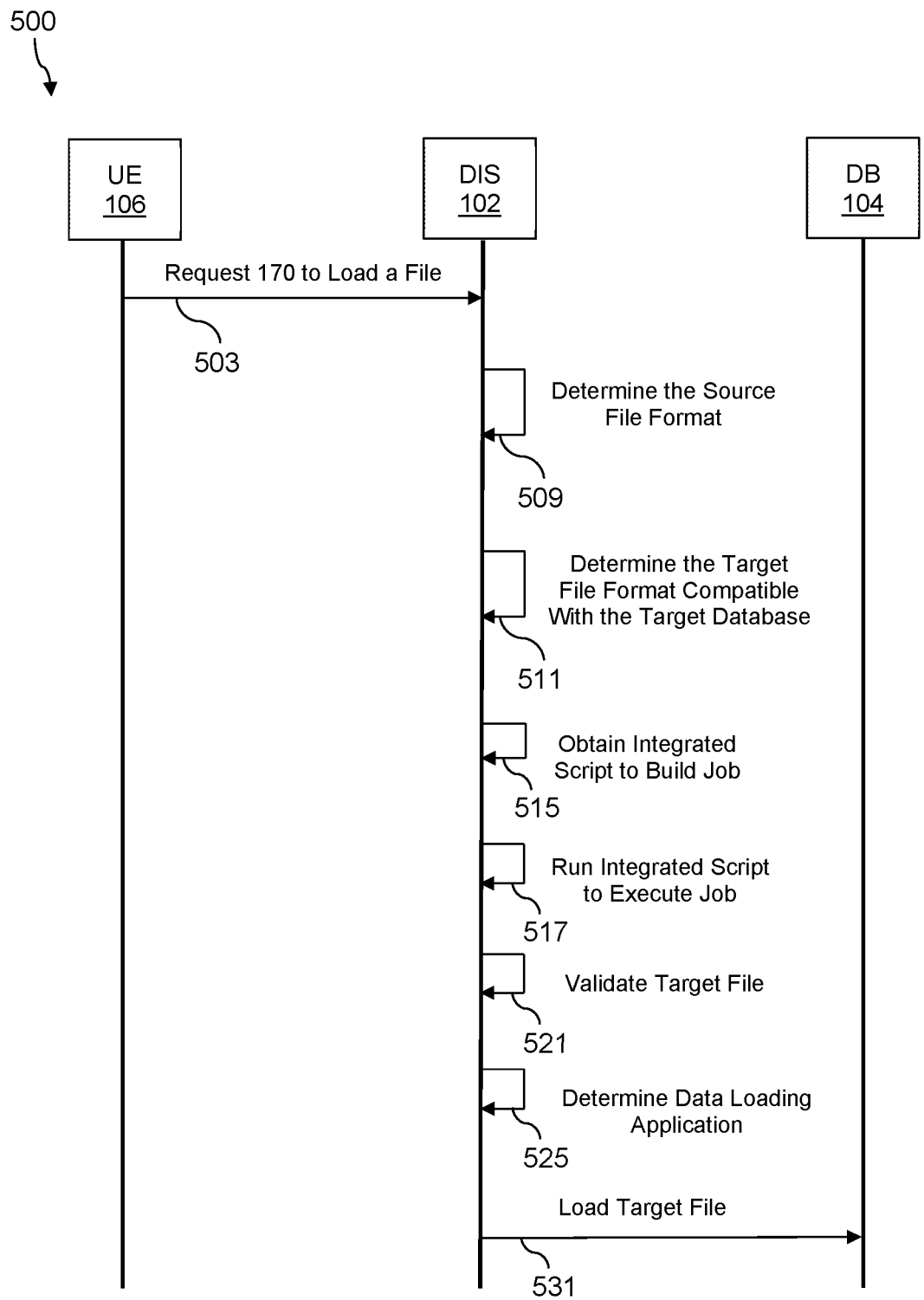
FIG. 5 is a message sequence diagram of a method performed by the system of FIG. 1 according to an embodiment of the disclosure.

Referring now to FIG. 5, a message sequence diagram illustrating a method 500 for integrating and loading the source file 134 to the target database 150A-B as the target file 136. The method 500 may be performed by the data integration server 102 (shown as the "DIS 102" in FIG. 5), in communication with the UE 106 and the database system 104 (shown as the "DS 104" in FIG. 5).

At step 503, UE 106 transmits the request 170 with metadata 138 to the data integration server 102 via the UE-to-server API 112. The data integration server 102 receives the request 170 via the server-to-UE API 124. The metadata 138 may include at least a description (e.g., name or location) of the source file 134 and the target database 150T. In some cases, the metadata 138 may include a description of the source database 150S, a format 153 of the source file 134, a format 153 of the target file 136, and/or other parameters 144.

At step 509, the integrator application 118 of the data integration server 102 determines the format 153 of the source file 134 in a manner similar to that described above with respect to step 206 of method 200. Similarly, at step 511, the integrator application 118 determines the format 153 of the target file 136, which is compatible with the target database 150T, also in a manner similar to that described above with respect to step 206 of method 200.

At step 515, the integrator application 118 obtains the scripts 132 based on the metadata 138 in the request 170, the determined format 153 of the source file 134, and the determined format 153 of the target file 136. The integrator application 118 may then generate the integrated script 133 based on the scripts 132. This step may be performed in a manner similar to that described above with respect to steps 209 and 210 of method 200, step 315 of method 300, or step 409 of method 400. By obtaining the integrated script 133, the integrator application 118 builds a job, which is to be executed by the data integration server 102, to integrate the source file 134 into the target database 150T as the target file 136.

At step 517, the integrator application 118 may execute the integrated script 133 to perform the steps of obtaining (e.g., extracting or receiving) the source file 134 from the source database 150S and transforming the source file 134 from the format 153 of the source file 134 to the format 153 of the target file 136, and loading the target file 136 to the target database 150T. By executing the integrated script 133, the integrator application 118 also runs the job built in step 515.

During execution of the integrated script 133, the data integration server 102 may also perform steps 521, 525, and 531. At step 521, an ABC application 122 validates the target file 136. For example, after executing the integrated script 133 to generate the target file 136, having the format 153 compatible with the target database 150T, the ABC application 122 may validate the target file 136 and correct any data if applicable. Step 521 may be performed in a manner similar to step 415 in method 400 of FIG. 4.

Only when the ABC application 122 has properly validated the target file 136 may the data integration server 102 perform step 525. At step 525, the integrator application 118 may determine one of the data loading applications 120, which may be used to load the target file 136 at the target database 150T in the most resource efficient and effective manner. Step 525 may be performed in a manner similar to step 309 in method 300 of FIG. 3.

After executing the integrated script 133 to generate the target file 136, validating the target file 136, and determining a data loading application 120, the data integration server 102 may perform step 531. At step 531, the data loading application 120 may generate an instruction to store the target file 136 at a location of the target database 150T, and transmit the instruction with the target file 136 to the database system 104 via the server-to-storage API 126. The instruction may include the location of the target database 150T. Upon receiving the instruction and the target file 136, the database system 104 may store the target file 136 in the target database 150T.

As mentioned above, the source database 150S and the target database 150T may be the same database or different databases. When the source database 150S and the target database 150T are the same, the steps of method 500 serve to change the format of a file in the database 150S/150T. When the source database 150S and the target database 150T are different databases 150A-B within the database system 104, the steps of method 500 serve to move a file between different databases 150A-B in the database system 104, while converting the file into a proper format. When the source database 150S and the target database 150T are located in completely different database systems 104 (e.g., the source database 150S is one of the databases 150C-D in the localized databases 107 and the target database 150T is one of the databases in the database system 104), the steps of method 500 serve to migrate a file from a localized database 150C-D to the database system 104, while converting the file into a proper format.

Figure 6:
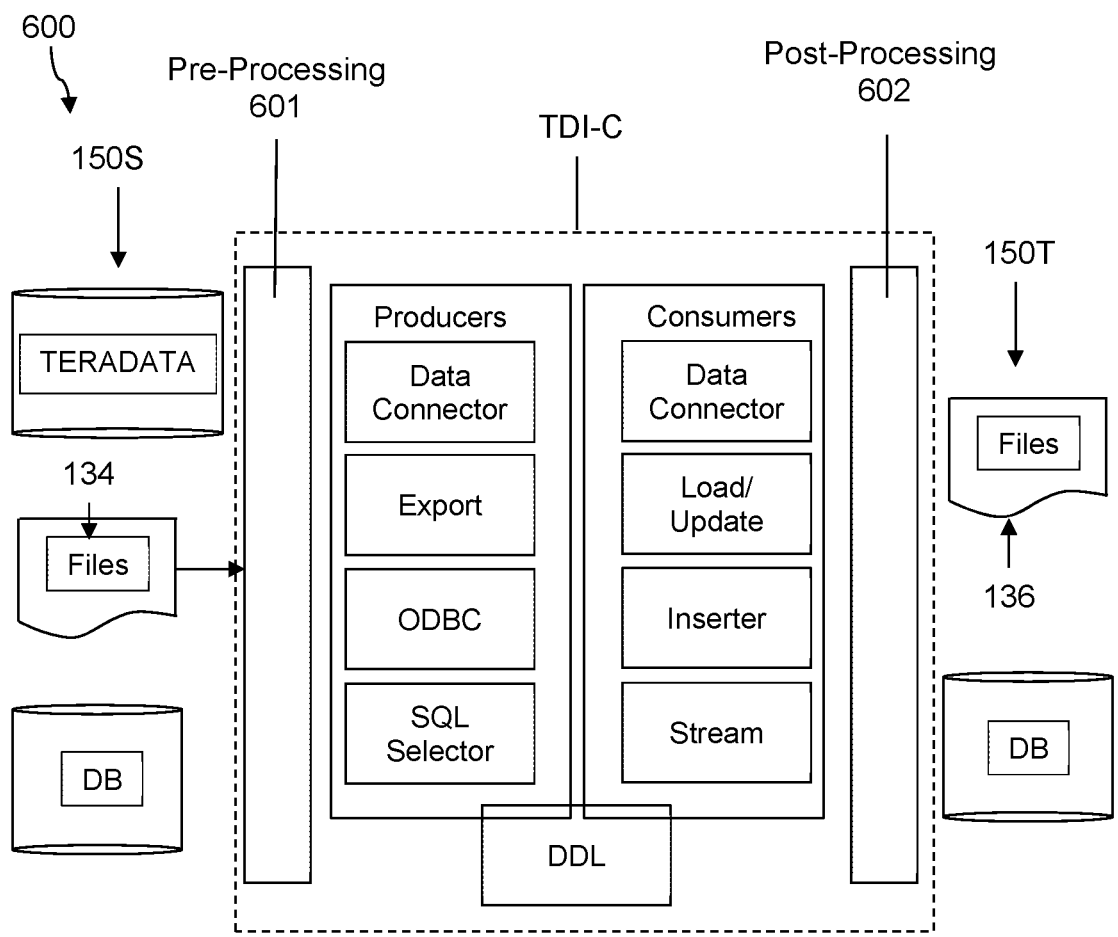
FIG. 6 is a diagram of an example architecture used to implement the methods in FIGS. 2-5 according to an embodiment of the disclosure.

Turning now to FIG. 6, shown is a diagram of an example architecture 600 implementing the data integration server 102 between source databases 150S and target databases 150T according to an embodiment of the disclosure. The example architecture 600 merely serves as an example to further illustrate the steps of methods 200, 300, 400, and 500. As should be appreciated, the example architecture 600 serves to merely illustrate one specific implementation of the embodiments disclosed herein, but should not otherwise be interpreted to further limit the embodiments disclosed herein in any form or fashion.

Architecture 600 illustrates a client application positioned between the source databases 150S and the target databases 150T, and architecture 600 illustrates a process flow of a source file 134 and target file 136 through the source databases 150S, client application, and target databases 150T. For example, the client application may be a T-MOBILE Data Integrator-Client (TDI-C). In an embodiment, the data integration server 102 may perform the steps of the TDI-C and include the components of the TDI-C shown in FIG. 6.

The process flow shown in the architecture 600 may begin upon receiving a request 170 including the metadata 138, regarding a source file 134 associated with a producer in the TDI-C. The source file 134 is to be transformed to a target file 136, and then further processed and loaded to a target database 150T by a consumer. The producer may include components such as a data connector to communicatively couple to the source database 150S, an export function to export the source file 134 from the source database 150S, an Open Database Connectivity (ODBC) API, an SQL selector, and data definition language (DDL) statements. The consumer may include components such as a data connector to communicatively couple to the target database 150T, DDL statements, and one or more data loading applications 120, a load/update, an inserter, and a stream, each being used to upload different types of data to different types of target databases.

As shown in FIG. 6, the source file 134 may come from a source database 150S, such as a database in a TERADATA data warehouse. The TDI-C may extract the source file 134 from the source database 150B, and then perform pre-processing 601 on the source file 134. In general, the pre-processing 601 may involve reviewing the source files 134, decrypting and decompressing the source files 134, and saving the source files 134 to a temporary location, and validating a manifest of the source files 134. Intermittent status checks may also be performed throughout this process flow.

In particular, the pre-processing 601 may include performing a file pattern check and collecting a list of files in the source file 134. When the source file 134 is not found, a notification may be sent to the UE 106 indicating the failure, and the process then terminates. Once the source file 134 is found, the TDI-C may perform decryption and decompression on the source file 134. A manifest generation and/or validation process may be performed on the source file 134. If the manifest validation process fails, a notification may be sent to the UE 106 indicating the failure and terminating the process. If the manifest validation process succeeds, the TDI-C may perform a flat file control lookup and a zero-byte column validation on the source file 134. If these processes fail, a notification may be sent to the UE 106 indicating the failure and terminating the process. If these processes succeed, the TDI-C proceeds to build and execute a job in response to the request, similar to the steps in methods 200, 300, 400, and 500 described herein.

To build the job, the TDI-C starts with the source file 134, which may include one or more files "FileList to Process." The source file 134 may be used to prepare a table schema and a work table schema, prepare operators to connect to source and targets, drop the work and temporary table, load data into the work table, perform validation checks and encryption, move good data to a stage table and bad data to an error table, and then drop the work table. Upon performing these steps, the target file 136 may be generated and post processing may be performed.

To perform post processing, the TDI-C may obtain the source file 134 (e.g., "FileList to Process"), clean up the decrypted files in the target file 136 and temporary tables, compress archive the pertinent files in the target file 136, and perform a flat file control entry and audit count checks (e.g., the ABC application 122 validation) on the target file 136. If any of these steps fail, a notification may be sent to the UE 106 indicating the failure, and the process would terminate. If all of these steps are successful, the source file 134 has been successfully transformed into the target file 136. The consumer may use the data connector to select one of data loading applications 120 (e.g., the load/update function, inserter function, or stream function) to load the target file 136 to the target database 150T).

Figure 7A:
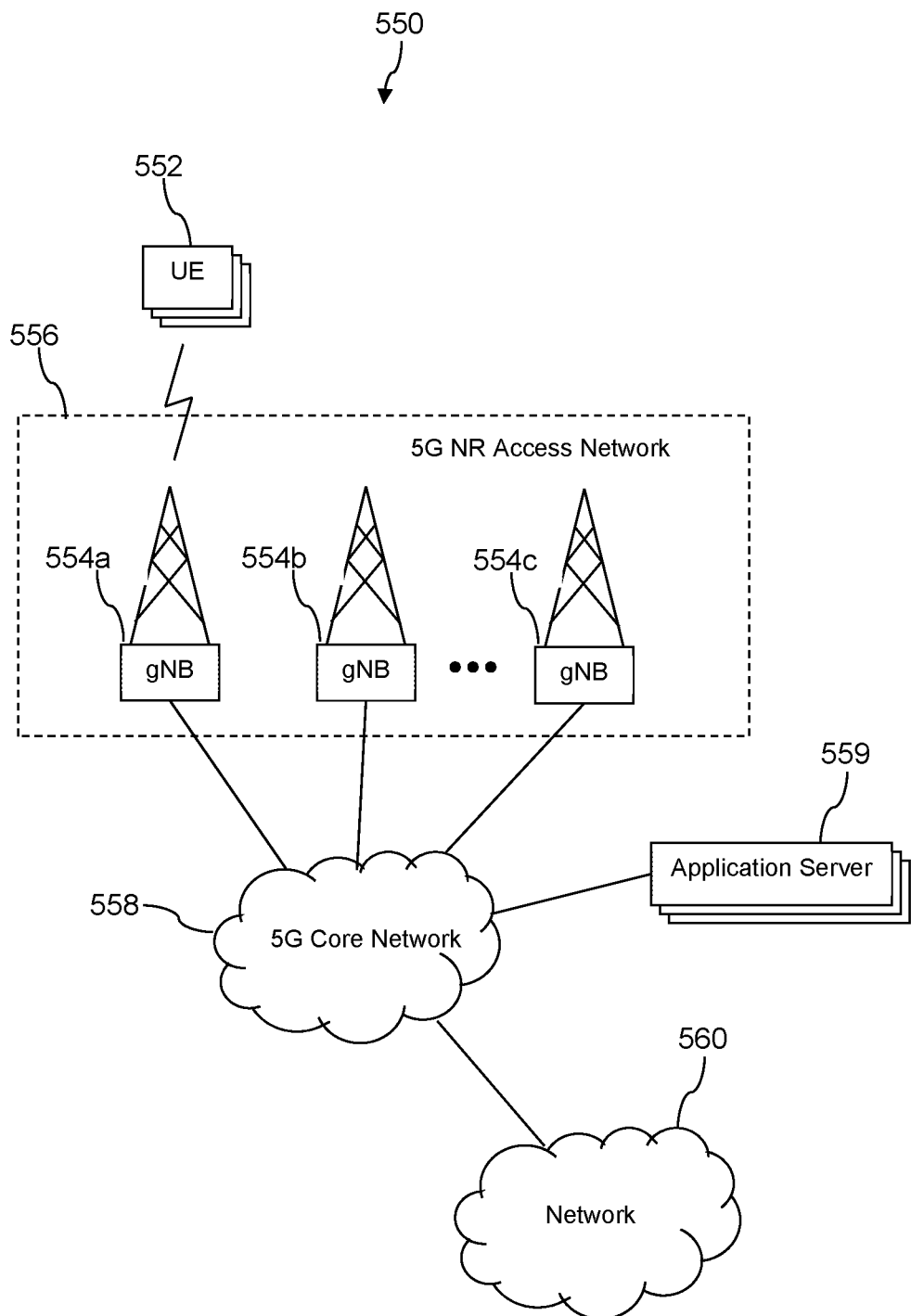
FIGS. 7A-B are block diagrams illustrating a communication system similar to the system of FIG. 1 according to an embodiment of the disclosure.

Turning now to FIG. 7A, an exemplary communication system 550 is described. In an embodiment, the communication system 550 may be implemented in the system 100 of FIG. 1. The communication system 550 includes a number of access nodes 554 that are configured to provide coverage in which UEs 552 (e.g., UE 106) such as cell phones, tablet computers, machine-type-communication devices, tracking devices, embedded wireless modules, and/or other wirelessly equipped communication devices (whether or not user operated), can operate. The access nodes 554 may be said to establish an access network 556. The access network 556 may be referred to as RAN in some contexts. In a 5G technology generation an access node 554 may be referred to as a gigabit Node B (gNB). In 4G technology (e.g., LTE technology) an access node 554 may be referred to as an eNB. In 3G technology (e.g., CDMA and GSM) an access node 554 may be referred to as a base transceiver station (BTS) combined with a base station controller (BSC). In some contexts, the access node 554 may be referred to as a cell site or a cell tower. In some implementations, a picocell may provide some of the functionality of an access node 554, albeit with a constrained coverage area. Each of these different embodiments of an access node 554 may be considered to provide roughly similar functions in the different technology generations.

In an embodiment, the access network 556 comprises a first access node 554a, a second access node 554b, and a third access node 554c. It is understood that the access network 556 may include any number of access nodes 554. Further, each access node 554 could be coupled with a core network 558 that provides connectivity with various application servers 559 and/or a network 560. In an embodiment, at least some of the application servers 559 may be located close to the network edge (e.g., geographically close to the UE 552 and the end user) to deliver so-called "edge computing." The network 560 may be one or more private networks, one or more public networks, or a combination thereof. The network 560 may comprise the public switched telephone network (PSTN). The network 560 may comprise the Internet. With this arrangement, a UE 552 within coverage of the access network 556 could engage in air-interface communication with an access node 554 and could thereby communicate via the access node 554 with various application servers and other entities.

The communication system 550 could operate in accordance with a particular radio access technology (RAT), with communications from an access node 554 to UEs 552 defining a downlink or forward link and communications from the UEs 552 to the access node 554 defining an uplink or reverse link. Over the years, the industry has developed various generations of RATs, in a continuous effort to increase available data rate and quality of service for end users. These generations have ranged from "1G," which used simple analog frequency modulation to facilitate basic voice-call service, to "4G"—such as Long Term Evolution (LTE), which now facilitates mobile broadband service using technologies such as orthogonal frequency division multiplexing (OFDM) and multiple input multiple output (MIMO).

Recently, the industry has been exploring developments in "5G" and particularly "5G NR" (5G New Radio), which may use a scalable OFDM air interface, advanced channel coding, massive MIMO, beamforming, mobile mmWave (e.g., frequency bands above 24 GHz), and/or other features, to support higher data rates and countless applications, such as mission-critical services, enhanced mobile broadband, and massive Internet of Things (IoT). 5G is hoped to provide virtually unlimited bandwidth on demand, for example providing access on demand to as much as 20 gigabits per second (Gbps) downlink data throughput and as much as 10 Gbps uplink data throughput. Due to the increased bandwidth associated with 5G, it is expected that the new networks will serve, in addition to conventional cell phones, general internet service providers for laptops and desktop computers, competing with existing ISPs such as cable internet, and also will make possible new applications in internet of things (IoT) and machine to machine areas.

In accordance with the RAT, each access node 554 could provide service on one or more radio-frequency (RF) carriers, each of which could be frequency division duplex (FDD), with separate frequency channels for downlink and uplink communication, or time division duplex (TDD), with a single frequency channel multiplexed over time between downlink and uplink use. Each such frequency channel could be defined as a specific range of frequency (e.g., in radio-frequency (RF) spectrum) having a bandwidth and a center frequency and thus extending from a low-end frequency to a high-end frequency. Further, on the downlink and uplink channels, the coverage of each access node 554 could define an air interface configured in a specific manner to define physical resources for carrying information wirelessly between the access node 554 and UEs 552.

Without limitation, for instance, the air interface could be divided over time into frames, subframes, and symbol time segments, and over frequency into subcarriers that could be modulated to carry data. The example air interface could thus define an array of time-frequency resource elements each being at a respective symbol time segment and subcarrier, and the subcarrier of each resource element could be modulated to carry data. Further, in each subframe or other transmission time interval (TTI), the resource elements on the downlink and uplink could be grouped to define physical resource blocks (PRBs) that the access node could allocate as needed to carry data between the access node and served UEs 552.

In addition, certain resource elements on the example air interface could be reserved for special purposes. For instance, on the downlink, certain resource elements could be reserved to carry synchronization signals that UEs 552 could detect as an indication of the presence of coverage and to establish frame timing, other resource elements could be reserved to carry a reference signal that UEs 552 could measure in order to determine coverage strength, and still other resource elements could be reserved to carry other control signaling such as PRB-scheduling directives and acknowledgement messaging from the access node 554 to served UEs 552. And on the uplink, certain resource elements could be reserved to carry random access signaling from UEs 552 to the access node 554, and other resource elements could be reserved to carry other control signaling such as PRB-scheduling requests and acknowledgement signaling from UEs 552 to the access node 554.

The access node 554, in some instances, may be split functionally into a radio unit (RU), a distributed unit (DU), and a central unit (CU) where each of the RU, DU, and CU have distinctive roles to play in the access network 556. The RU provides radio functions. The DU provides L1 and L2 real-time scheduling functions; and the CU provides higher L2 and L3 non-real time scheduling. This split supports flexibility in deploying the DU and CU. The CU may be hosted in a regional cloud data center. The DU may be co-located with the RU, or the DU may be hosted in an edge cloud data center.

Figure 7B:
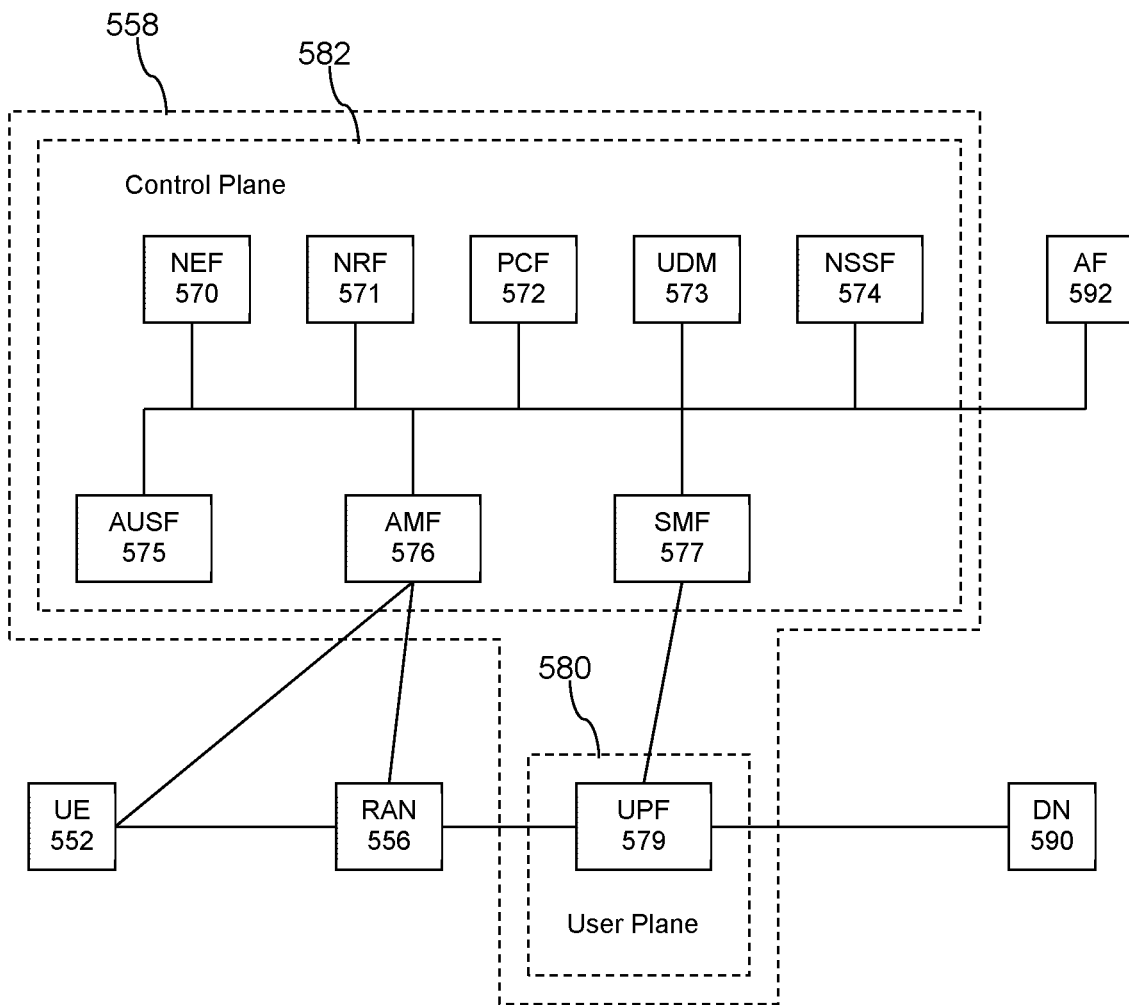

Turning now to FIG. 7B, further details of the core network 558 are described. In an embodiment, the core network 558 is a 5G core network. 5G core network technology is based on a service based architecture paradigm. Rather than constructing the 5G core network as a series of special purpose communication nodes (e.g., an HSS node, a MME node, etc.) running on dedicated server computers, the 5G core network is provided as a set of services or network functions. These services or network functions can be executed on virtual servers in a cloud computing environment which supports dynamic scaling and avoidance of long-term capital expenditures (fees for use may substitute for capital expenditures). These network functions can include, for example, a user plane function (UPF) 579, an authentication server function (AUSF) 575, an access and mobility management function (AMF) 576, a session management function (SMF) 577, a network exposure function (NEF) 570, a network repository function (NRF) 571, a policy control function (PCF) 572, a unified data management (UDM) 573, a network slice selection function (NSSF) 574, and other network functions. The network functions may be referred to as virtual network functions (VNFs) in some contexts.

Network functions may be formed by a combination of small pieces of software called microservices. Some microservices can be re-used in composing different network functions, thereby leveraging the utility of such microservices. Network functions may offer services to other network functions by extending application programming interfaces (APIs) to those other network functions that call their services via the APIs. The 5G core network 558 may be segregated into a user plane 580 and a control plane 582, thereby promoting independent scalability, evolution, and flexible deployment.

The UPF 579 delivers packet processing and links the UE 552, via the access network 556, to a data network 590 (e.g., the network 560 illustrated in FIG. 7A). The AMF 576 handles registration and connection management of non-access stratum (NAS) signaling with the UE 552. Said in other words, the AMF 576 manages UE registration and mobility issues. The AMF 576 manages reachability of the UEs 552 as well as various security issues. The SMF 577 handles session management issues. Specifically, the SMF 577 creates, updates, and removes (destroys) protocol data unit (PDU) sessions and manages the session context within the UPF 579. The SMF 577 decouples other control plane functions from user plane functions by performing dynamic host configuration protocol (DHCP) functions and IP address management functions. The AUSF 575 facilitates security processes.

The NEF 570 securely exposes the services and capabilities provided by network functions. The NRF 571 supports service registration by network functions and discovery of network functions by other network functions. The PCF 572 supports policy control decisions and flow based charging control. The UDM 573 manages network user data and can be paired with a user data repository (UDR) that stores user data such as customer profile information, customer authentication number, and encryption keys for the information. An application function 592, which may be located outside of the core network 558, exposes the application layer for interacting with the core network 558. In an embodiment, the application function 592 may be executed on an application server 559 located geographically proximate to the UE 552 in an "edge computing" deployment mode. The core network 558 can provide a network slice to a subscriber, for example an enterprise customer, that is composed of a plurality of 5G network functions that are configured to provide customized communication service for that subscriber, for example to provide communication service in accordance with communication policies defined by the customer. The NSSF 574 can help the AMF 576 to select the network slice instance (NSI) for use with the UE 552.

Figure 8:
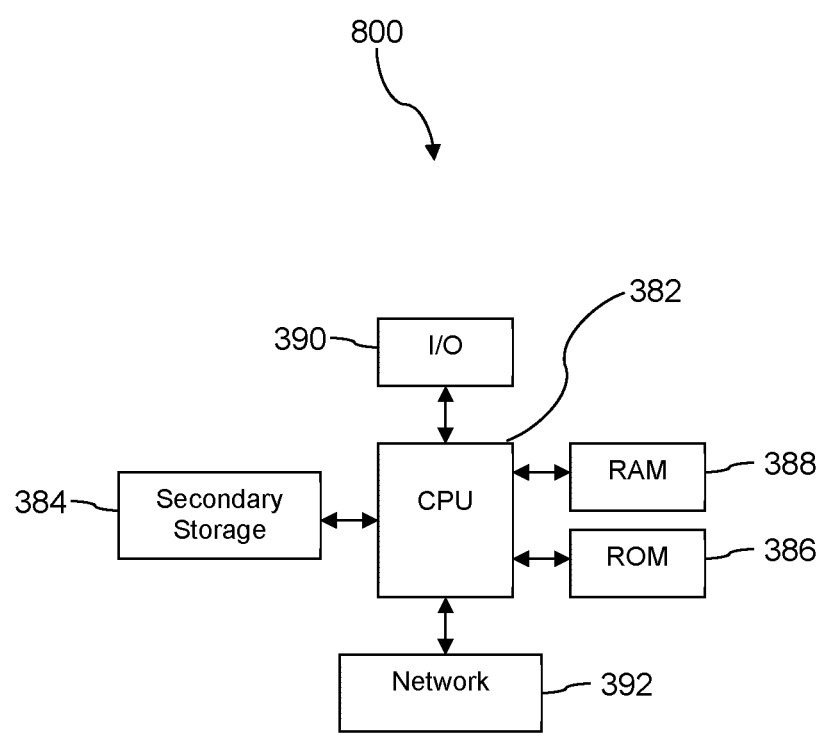
FIG. 8 is a block diagram of a computer system implemented within the system of FIG. 1 or FIGS. 7A-B according to an embodiment of the disclosure.

FIG. 8 illustrates a computer system 800 suitable for implementing one or more embodiments disclosed herein. In an embodiment, one or more of the data integration server 102, database systems 104, and UE 106 may be implemented as the computer system 800. The computer system 800 includes a processor 382 (which may be referred to as a central processor unit or CPU) that is in communication with memory devices (e.g., non-transitory memory 130) including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 800, at least one of the CPU 382, the RAM 388, and the ROM 386 are changed, transforming the computer system 800 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 800 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-transitory memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), Wi-Fi (IEEE 802.11), Bluetooth, Zigbee, narrowband Internet of things (NB IoT), near field communications (NFC), and radio frequency identity (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 800 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 800 to provide the functionality of a number of servers that is not directly bound to the number of computers in the computer system 800. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 800, at least portions of the contents of the computer program product to the secondary storage 384, to the ROM 386, to the RAM 388, and/or to other non-transitory, non-volatile memory and/or volatile memory of the computer system 800. The processor 382 may process the executable instructions and/or data structures in part by directly accessing the computer program product, for example by reading from a CD-ROM disk inserted into a disk drive peripheral of the computer system 800. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 800.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 800 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method performed by a data integration server for automatically integrating data from a source database to a target database, wherein the method comprises:
   receiving, from a user equipment via a server-to-user equipment application programming interface, a request to store a source file in a target database as a target file compatible with the target database, wherein the request comprises metadata describing the source file, a source database storing the source file, and the target database;
   determining, by an integrator application of the data integration server, a source file format of the source file based on the metadata;
   determining, by the integrator application, a target file format of the target file based on the metadata, wherein the target file format is compatible with the target database;
   determining, by the integrator application, a data loading application selected from among a sequential data loading application and a parallel data loading application based on the target file format and the target database;
   automatically generating, by the integrator application, an integrated script based on a plurality of pre-defined scripts, the metadata, the source file format, and the target file format, wherein the integrated script comprises a set of instructions that, when executed, obtain the source file from the source database, transform the source file from the source file format to the target file format to obtain the target file, and load the target file to the target database using the determined data loading application;
   validating, by an audit, balance, and control application of the data integration server, data in the target file; and
   executing, by the determined data loading application, the integrated script to cause the data loading application to load the target file to the target database only in response to the data in the target file being validated, wherein the metadata comprises at least a parameter related to the transformation and loading of the target file that indicates that the target file is to be archived into a local datastore before being loaded to the target database, and wherein the integrated script comprises pre-defined instructions that, when executed, archive the target file to the local datastore prior to loading the target file to the target database.

2. The method of claim 1, wherein the metadata only describes the source file, the source database, and the target database.

3. The method of claim 1, wherein the metadata comprises a location of the source file, a name or location of the source database, a name or location of the target database, and at least one of the source file format or the target file format.

4. The method of claim 1, wherein the metadata comprises another parameter that indicates that the source file is to be transformed using a duplicate file, and wherein the integrated script comprises pre-defined instructions that, when executed, obtain a duplicate of the source file from the source database, transform the duplicate of the source file to the target file, and load the target file to the target database.

5. The method of claim 1, wherein the data loading application is determined from the data loading applications based on a size of the target file.

6. The method of claim 1, wherein the data loading application is determined from the data loading applications based on a capacity in the target database.

7. A method performed by a data integration server for automatically integrating data from a source database to a target database, wherein the method comprises:
receiving, from a user equipment via a server-to-user equipment application programming interface, a request to store a source file in a target database, wherein the request comprises metadata describing the source file, a source database storing the source file, and the target database;
determining, by an integrator application of the data integration server, a source file format of the source file based on the metadata;
determining, by the integrator application, a target file format of the target file, wherein the target file format is compatible with the target database based on the metadata;
automatically generating, by the integrator application, an integrated script based on a plurality of pre-defined scripts, the metadata, the source file format, and the target file format, wherein the integrated script comprises instructions that, when executed, obtain the source file from the source database, transform the source file from the source file format to the target file format to obtain the target file, and load the target file to the target database;
executing, by the integrator application, the integrated script to obtain the source file from the source database and transform the source file from the source file format to the target file format to obtain the target file;
validating, by an audit, balance, and control application of the data integration server, data in the target file; and
executing, by a data loading application of the data integration server selected from among a plurality of data loading applications based on the target file format and characteristics of the target database, the integrated script to cause the data loading application to load the target file to the target database only in response to the data in the target file being validated, the data loading application selected based on the target file from among a sequential data loading application and a parallel data loading application, wherein the metadata comprises at least a parameter related to the transformation and loading of the target file that indicates that the target file is to be archived into a local datastore before being loaded to the target database, and wherein the integrated script comprises pre-defined instructions that, when executed, archive the target file to the local datastore prior to loading the target file to the target database.

8. The method of claim 7, wherein the metadata only describes the source file, the source database, and the target database.

9. The method of claim 7, wherein the metadata comprises a location of the source file, a name or location of the source database, a name or location of the target database, and at least one of the source file format or the target file format.

10. The method of claim 7, wherein the data loading application is determined from the data loading applications based on a size of the target file.

11. A system for automatically integrating data from a source database to a target database, wherein the system comprises:
the source database comprising a source file;
the target database;
a data integration computer system coupled to the source database and the target database, comprising:
one or more processors;
one or more non-transitory memories coupled to the one or more processors;
a server-to-user equipment application programming interface configured to receive a request to store the source file in the target database as a target file compatible with the target database, wherein the request comprises metadata describing the source file, the source database, and the target database;
an integrator application stored in one of the one or more non-transitory memories that, when executed by one of the one or more processors, cause the one of the one or more processors to:
determine a source file format of the source file based on the metadata;
determine a target file format of the target file, wherein the target file format is compatible with the target database based on the metadata;
obtain a plurality of scripts based on the metadata, the source file format, and the target file format, wherein the scripts comprise pre-defined instructions that, when executed, obtain the source file from the source database, transform the source file from the source file format to the target file format to obtain the target file, and load the target file to the target database;
automatically generate an integrated script based on the scripts;
execute the integrated script to:
obtain, by the integrator application, the source file from the source database; and
transform, by the integrator application, the source file from the source file format to the target file format to obtain the target file; and
validate data in the target file; and
a plurality of data loading applications stored in one of the one or more non-transitory memories, wherein the integrator application further causes the one of the one or more processors to determine a sequential data loading application or a parallel data loading application from the data loading applications based on the target file format and characteristics of the target database, wherein the data loading application, when executed by one of the one or more processors, causes the one or more processors to load the target file to the target database only in response to the data in the target file being validated, wherein the metadata comprises at least a parameter related to the transformation and loading of the target file that indicates that the target file is to be archived into a local datastore before being loaded to the target database, and wherein the integrated script comprises pre-defined instructions that, when executed, archive the target file to the local datastore prior to loading the target file to the target database.

12. The system of claim 11, wherein the metadata only describes the source file, the source database, and the target database.

13. The system of claim 11, wherein the metadata comprises a location of the source file, a name or location of the source database, a name or location of the target database, and at least one of the source file format or the target file format.

14. The system of claim 13, wherein the parameter indicates at least one of the following:
   the target file is to be encrypted prior to being loaded to the target database;
   the target file is to be compressed prior to being loaded to the target database;
   the target file is to be validated prior to being loaded to the target database;
   the source file is to be transformed using a duplicate file;
   a manifest for the target file is to be generated for the target file and loaded to the target database with the target file;
   a manifest for the source file is to be validated prior to the source file being transformed to the target file and loaded to the target database;
   the target file is to be loaded to the target database with password protection;
   the source file is to be processed to remove invisible lines in the source file;
   the target file is to be split into separate files before being loaded to the target database; or
   the target file is to be archived into a local datastore before being loaded to the target database.

15. The system of claim 11, wherein the integrated script includes a pipeline of the scripts and is arranged sequentially based on at least one of an input of each script, an output of each script, or a condition imposed on outputs of one or more of the scripts.

* * * * *